United States Patent [19]

Mitamura et al.

[11] 4,305,022
[45] Dec. 8, 1981

[54] HORIZONTAL SCANNING RATE CORRECTION APPARATUS

[75] Inventors: Ichiro Mitamura, Tokyo; Katsuo Isono, Kawagoe, both of Japan

[73] Assignee: Sony Corporation, Tokyo, Japan

[21] Appl. No.: 100,820

[22] Filed: Dec. 6, 1979

[30] Foreign Application Priority Data

Dec. 8, 1978 [JP] Japan ............................... 53-152583

[51] Int. Cl.³ ........................ H01J 29/70; H04N 9/24
[52] U.S. Cl. ...................................... 315/370; 358/67
[58] Field of Search ................... 315/370, 371; 358/67

[56] References Cited

U.S. PATENT DOCUMENTS

| | | | |
|---|---|---|---|
| 2,844,759 | 7/1958 | Bryan | 315/370 X |
| 2,863,937 | 12/1958 | Kalfaian | 315/370 X |
| 4,099,092 | 7/1978 | Bristow | 315/370 X |
| 4,122,485 | 10/1978 | Sonntag et al. | 315/370 X |
| 4,159,484 | 6/1979 | Strathman | 358/67 |

*Primary Examiner*—Malcolm F. Hubler
*Attorney, Agent, or Firm*—Lewis H. Eslinger; Alvin Sinderbrand

[57] ABSTRACT

A horizontal scanning rate correction apparatus for a cathode-ray tube, particularly of the beam index color cathode-ray tube type, includes a memory for storing correction values representing deviations of the horizontal scanning rate of the electron beam from a desired scanning rate at each of a plurality of horizontal sampling positions along each of a plurality of predetermined horizontal sampling lines which are substantially fewer in number than the horizontal lines along which scanning occurs. During display of a video signal, a selected one of the stored correction values is read out of the memory for each scanning position of the beam along a scanned one of the horizontal lines, with each read correction value, and a corresponding sampling line correction signal produced therefrom, representing the deviation at a corresponding horizontal sampling position on one of the sampling lines. A scanned line correction signal is then produced for each horizontal scanning position which is a function of the sampling line correction signal and of the vertical position of the respective scanned line, and the scanned line correction signal is applied to the beam deflection yoke or device to substantially cancel the scanning rate deviation.

18 Claims, 8 Drawing Figures

HORIZONTAL SCANNING RATE CORRECTION APPARATUS

BACKGROUND OF THE INVENTION

1. Field of the Invention

This invention relates to apparatus for controlling the horizontal scanning rate in cathode-ray tubes, and more particularly is directed to such an apparatus which is adapted for use with a beam index color cathode ray tube.

2. Description of the Prior Art

In cathode-ray tubes in which an electron beam is caused to repeatedly scan across the screen in a vertical succession of horizontal lines, it is important to control the rate at which the electron beam travels across each horizontal line. It is common for the picture information within a video signal to be timed in such a manner that it will be projected with the proper shape upon the screen of a cathode-ray tube only if the electron beam travels across each fraction of a horizontal line at a specified rate. Deviations of the horizontal scanning rate from such a specified rate cause distortions in the shape of the projected image and are thus undesirable.

Deviations in the horizontal scanning rate are particularly undesirable in beam index color television receivers because such deviations may also cause color misregistration in such receivers.

Beam index color television receivers are well known in the prior art, and usually include a cathode-ray tube, or picture tube having an electron gun which emits a single electron beam and a phosphor screen having a repeating pattern of red, green and blue primary color phosphor stripes extending vertically upon the screen. The beam index picture tube also has a plurality of vertical index phosphor stripes spaced across its phosphor screen in a known relationship to the spacing of the color phosphor stripes. When the electron beam horizontally scans the screen, a photodetector generates an index signal in response to the light emitted each time an index stripe is struck by the electron beam. This index signal is used to achieve color registration by controlling the color switching circuit which determines when the three primary color signals respectively modulate the intensity of the electron beam so that, at any moment, the intensity of the electron beam is modulated by the primary color signal whose corresponding color phosphor stripe is then being scanned by the beam.

In such beam index color television receivers deviations in the horizontal scanning rate cause color misregistation because there is an inherent delay in the response of the color switching circuit to changes in the horizontal scanning rate of the beam and it is difficult to compensate therefor. This delay results from the fact that it is common for index signal processing circuitry, for example, comprised of a bandpass filter and a phase-locked loop (PLL) circuit, to be interposed between a photodetector which detects the index signal and the color switching circuit. The bandpass filter removes unwanted noise from the index signal in preparation for the application of that signal to the input of the PLL circuit which provides an input to the color switching circuit of greater uniformity, in amplitude and frequency, than the index signal. In addition, by insertion of a frequency divider in the feedback loop of the PLL circuit, the latter can be made to produce an output frequency which is a predetermined multiple of the frequency of the index signal. The last feature is important since in most beam index color cathode ray tubes the number of color phosphor stripes is not equal to, but instead is an integral multiple of, the number of index stripes.

Unfortunately, the delay inherently associated with the above-described index signal processing circuitry, particularly with the PLL circuit, varies as a function of the frequency of the index signal, which in turn varies in proportion to the horizontal scanning rate. For this reason, a variation in the scanning rate is not immediately or precisely reflected in a corresponding change in the rate of color switching so that deviations in the horizontal scanning rate adversely affect color registration.

Deviations in the horizontal scanning rate are also disadvantageous in beam index color television receivers because they make it more difficult for the PLL circuit to correctly follow and lock onto the instantaneous frequency of the index signal, as is necessary for proper color registration. In order to cause the PLL circuit to properly follow the frequency of an index signal when the horizontal scanning rate deviates, it is necessary to increase the minimal signal strength of the index signal. This requires that the minimal intensity of the electron beam be increased, which, in turn, has the undesirable result of increasing the luminance of the darkest areas that can be projected on the picture tube, and, thus, of decreasing the contrast of the produced image.

For all of the above reasons, it is desirable to limit the maximum fluctuations in the horizontal scanning rate of beam index color television receivers to less than several tenths of one percent. The prior art contains various proposed schemes for correction of the horizontal scanning rate, but unfortunately none of them has been able to limit the scanning rate fluctuation to the desired level of less than several tenths of one percent.

In the copending application Ser. No. 99,911, filed Dec. 3, 1979, and assigned to the same assignee as this application, there is disclosed a horizontal scanning rate correction apparatus having a memory for storing corrections values representing deviations of the horizontal scanning rate from a desired scanning rate at a plurality of respective horizontal sampling positions along a plurality of horizontal lines, and circuitry for reading the correction values from the memory as a video signal is being displayed and for producing corresponding signals supplied to a horizontal deflection device to substantially cancel the unwanted deviations in the horizontal scanning rate. The apparatus disclosed in such copending application is designed for use with an index beam color cathode-ray tube in which a PLL circuit including a voltage-controlled oscillator receives the index signal as an input and produces an output having a frequency equal to the frequency at which color phosphors are being scanned. In such a PLL circuit the control voltage fed to the voltage-controlled oscillator is proportional to the frequency of the index signal, and it is from this control voltage that the correction values stored in the memory circuitry are derived.

The foregoing scanning rate correction apparatus can accurately cancel deviations occurring in a particular horizontal scanning line so long as the correction values accurately correspond to the deviation of the horizontal scanning rate along that line and as long as enough correction values are stored in the memory to accurately indicate variations in the scanning rate which occur along its length. For example, it has been found that, if accurate correction values are recorded for 32 sampling positions along a given horzontal line, the apparatus will be able to cancel deviations in the horizontal rate along the line sufficiently to substantially remove the above-mentioned undesirable effects of deviations in the horizontal scanning rate.

Such horizontal scanning rate correction apparatus would produce ideal results if correction values were stored for each horizontal line of the video field. Unfortunately, this would require a very large and expensive memory capacity, since there are 236 lines in the effective picture area of the video field of an NTSC video signal. For example, if 32 8-bit correction values were stored for each of 236 lines, a memory capacity of 60,416 bits would be required.

It would be possible to reduce the memory capacity required of such a horizontal scanning rate correction apparatus by storing correction values for less than the total number of horizontal lines in the effective picture portion of each field, for example, for every 16th horizontal line, and then substituting correction values from a nearby line for which values have been stored when scanning a horizontal line for which correction values have not been stored. Unfortunately, such a method of correcting for deviations in the horizontal scanning rate often produces poor results. If a group of horizontal lines at various vertical positions all have their scanning rate corrected according to correction values stored for only one of such lines, no compensation is provided for the difference in the horizontal scanning rates occurring as a result of the different vertical positions. Furthermore, a relatively large difference will exist between the scanning rate corrections made to a first group of horizontal lines corrected according to a set of correction values specific for one of those lines and that made to a next group of horizontal lines corrected according to a set of correction values specific for a line in such next group. Such large difference between the scanning rate corrections is likely to create a distorted picture in which the groups of horizontal lines corrected according to different correction values appear as horizontal bands.

OBJECTS AND SUMMARY OF THE INVENTION

Accordingly, it is an object of the present invention to provide horizontal scanning rate correction apparatus for cathode-ray tubes that avoids the above-described defects inherent in the prior art.

Another object of the invention is to provide horizontal scanning rate connection apparatus which substantially eliminates deviations in the horizontal scanning rate of a cathode-ray tube by reading correction values from a memory and using those values to generate correction signals supplied to a horizontal deflection device, and which can operate effectively with a reduced memory capacity to accurately compensate for deviations in the horizontal scanning rate and thereby produce a substantially distortion-free image.

Still another object of this invention is to provide a horizontal scanning rate correction apparatus, as aforesaid, which is particularly suited for use with beam index color cathode-ray tubes of the type having a screen scanned by an electron beam, a plurality of index elements positioned to be struck by the electron beam as it scans across the screen, a beam deflection device supplied with at least horizontal and vertical beam deflection signals for causing the electron beam to repeatedly scan across the screen in a vertical succession of horizontal lines, and an index signal processing circuit for producing an index signal of a frequency determined by the frequency of the incidence of the electron beam upon the index elements as it scans across the horizontal lines and for controlling color switching circuitry which determines which of a plurality of color signals modulates the intensity or density of the electron beam, with such processing circuit including a phase-locked loop having a voltage-controlled oscillator, and with the correction values stored in the memory being derived from the control voltage for such oscillator.

In accordance with an aspect of this invention, a horizontal scanning rate correction apparatus for a cathode-ray tube having a screen which is scanned by an electron beam in a vertical succession of horizontal lines, comprises memory means for storing correction values representing deviations of the horizontal scanning rate of the electron beam from a desired scanning rate at a plurality of predetermined horizontal sampling positions along each of a plurality of predetermined sampling lines from among the horizontal lines scanned across the screen by the electron beam, reading means for reading a selected one of the stored correction values for each horizontal scanning position of the electron beam along a scanned one of the horizontal lines, with each correction value that is read representing the deviation of the horizontal scanning rate at a corresponding one of the horizontal sampling positions on one of the sampling lines for which correction values have been stored, a sampling line correction signal being produced in correspondence to each of the correction values that is read from the memory means, means for producing, for each horizontal scanning position, a scanned line correction signal which is a function of the sampling line correction signal then being produced and of the vertical position of that scanned horizontal line, and means for supplying the scanned line correction signal to the beam deflection device or yoke of the cathode-ray tube so that the deviation of the horizontal scanning rate along the scanned line is substantially cancelled.

According to another aspect of the invention, the scanned line correction signal is produced for scanning positions on scanned horizontal lines other than the sampling lines for which correction values have been stored by interpolating between two sets of sampling line correction signals produced by the reading means. This interpolation is based on the vertical position of the scanned line relative to the vertical positions of the sampling lines to which the correction values actually read from the memory means correspond.

According to yet another aspect of the invention, the beam deflection device used with the cathode-ray tube includes the usual horizontal and vertical deflection coils for receiving the horizontal and vertical beam deflection signals, respectively, and a separate correction coil placed on a yoke separate from the horizontal and vertical deflection coils for receiving the deflection correction signal.

The above, and other objects, features, and advantages of the invention, will be apparent in the following detailed description of illustrative embodiments of the invention which is to be read in connection with the accompanying drawings.

DETAILED DESCRIPTION OF PREFERRED EMBODIMENTS

Figure 1:
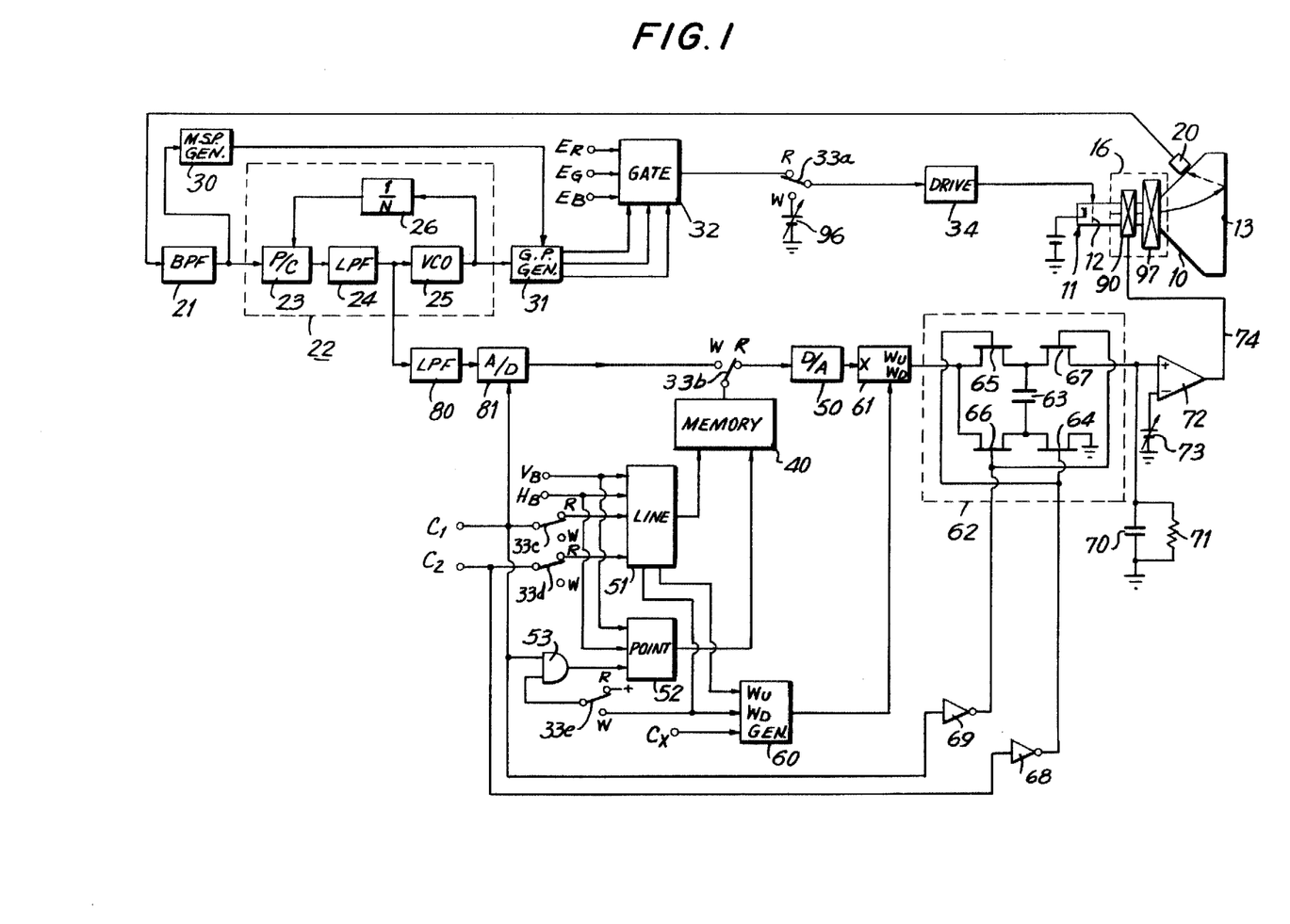
FIG. 1 is a block diagram of a horizontal scanning rate correction apparatus according to one embodiment of the present invention, and which is shown applied to a beam index color cathode-ray tube.

Referring first to FIG. 1, it will be seen that a beam index color cathode-ray or picture tube 10 to which this invention may be applied is provided with an electron gun 11 that emits a single electron beam, the intensity or density of which is modulated by a signal applied to a grid electrode 12 forming part of electron gun 11. Picture tube 10 also includes a phosphor screen 13 composed of a repeating pattern of red, green and blue primary color phosphor stripes R, G, B (FIG. 2) extending vertically upon the inner surface of the glass faceplate or panel 14 of picture tube 10. A thin metallic layer 15, for example, a vacuum deposited aluminum, covers the inner surface of screen 13 and is transparent to electrons of the electron beam while being effective to reflect toward the viewer the light emitted by the color phosphor stripes. A plurality of vertical index phosphor stripes I are spaced across layer 15 on the inside surface of phosphor screen 13 in a known relationship to the spacing of color phosphor stripes R, G and B. A beam deflection device 16 (FIG. 1) is supplied with horizontal and vertical beam deflection signals for causing the electron beam emitted by electron gun 11 to repeatedly scan across screen 13 in a vertical succession of horizontal lines.

An index signal processing circuit is associated with tube 10 and is comprised of a photodetector 20, a bandpass filter 21 and a phase-locked loop (PLL) circuit 22. PLL circuit 22 includes a phase-comparator 23, a low-pass filter 24, a voltage-controlled oscillator 25, and a frequency divider 26. The index signal processing circuit is used for controlling color switching circuitry comprised of a mode set pulse generator 30, a gate pulse generator 31, and a gate circuit 32, which determines when each of a plurality of color signals $E_R$, $E_G$ or $E_B$ is supplied to grid 12 so as to modulate the intensity or density of the electron beam.

When the electron beam emitted by electron gun 11 horizontally scans screen 13, photodetector 20 provided at the funnel-shaped portion of picture tube 10 generates an index signal in response to the light emitted each time that an index stripe I is struck by the electron beam. The output signal from photodetector 20 is applied to bandpass filter 21 for the purpose of removing therefrom certain signal components, such as, those generated during the flyback period, which have frequencies different than the frequency with which the electron beam strikes index stripes I during horizontal scanning intervals. The resulting index signal produced at the output of bandpass filter 21 has a frequency determined by the distance between index phosphor stripes I and the scanning speed of the electron beam. The index stripes I are uniformly spaced apart across the image area of screen 13 so that the frequency of the index signal varies in proportion to the horizontal scanning rate of the beam during the horizontal scanning intervals. The index signal from the output of bandpass filter 21 is applied to one input of phase comparator 23 in PLL circuit 22. The variable output voltage of phase comparator 23 is applied, through low-pass filter 24 which removes unwanted noise therefrom, to the control input of voltage-controlled oscillator 25 which has a central frequency N times the normal frequency of the index signal. The output from voltage-controlled oscillator 25 is supplied to the input of frequency divider 26 which divides the frequency thereof by N, where N is an integral value representing the number of color phosphor stripes R, G, B between adjacent index phosphor stripes I. The output of frequency divider 26 is supplied to a second input of phase comparator 23 for phase comparison with the index signal derived from the output of bandpass filter 21.

As a result of the foregoing arrangement of PLL circuit 22, the output of the voltage-controlled oscillator 25 will vary in frequency until the two input signals supplied to phase comparator 23 are of the same frequency and phase. Thus, the output of voltage-controlled oscillator 25 will have a frequency which is N times as great as the frequency of the index signal and three times as great as the so-called triplet frequency at which the repeating patterns of red, green and blue color phosphor stripes R, G, B are scanned by the electron beam, so that one pulse is generated by voltage-controlled oscillator 25 for each of the color phosphor stripes being scanned.

Each time the frequency of the index signal supplied to one input of phase comparator 23 is varied, phase comparator 23 generates an output voltage which, when applied through low-pass filter 24, causes voltage-controlled oscillator 25 to suitably vary its output frequency and phase for restoring the equilibrium at comparator 23. Thus, it can be seen that the voltage supplied by phase comparator 23 through low-pass filter 24 to the input of voltage-controlled oscillator 25 varies with changes in the frequency of the index signal.

The output of PLL circuit 22 is applied to gate pulse generator 31, which, for example, may include a ring counter (not shown). Gate pulse generator 31 responds to each output pulse from voltage-controlled oscillator 25 by producing either a red, a green, or a blue gating pulse, in response to the count of its ring counter. The resulting repeated sequences of red, green and blue gating pulses are 120° out of phase from each other and are supplied to respective control inputs of gate circuit 32. In response to these repeated sequences of gating pulses, suitable gates (not shown) in gate circuit 32 sequentially select red, green and blue primary color signals $E_R$, $E_G$ and $E_B$, respectively, and supply the gated or selected color signal through an R contact of a mode selector switch 33a to the input of a drive circuit 34 which, in turn, provides the selected color signal to grid 12 so that it can modulate the intensity or density of the electron beam projected upon screen 13.

Figure 2:
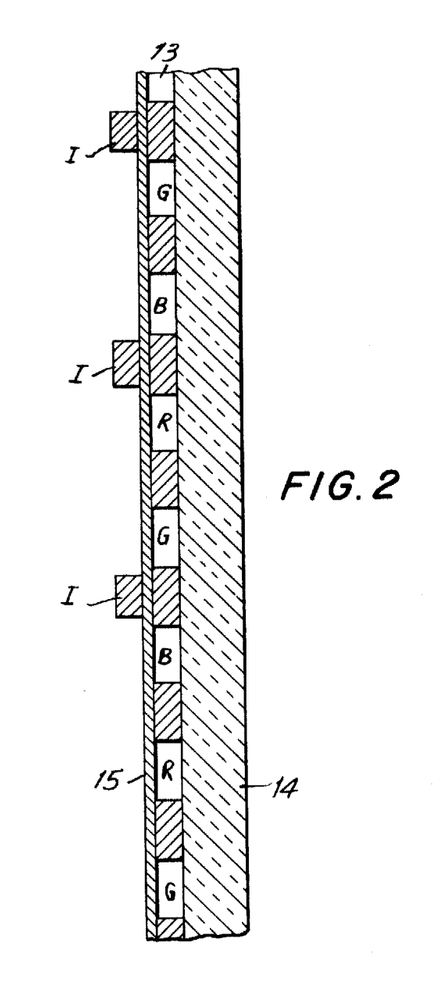
FIG. 2 is an enlarged fragmentary sectional view showing a section of the screen of the cathode-ray tube of FIG. 1.

The index signal from bandpass filter 21 is also applied to mode set pulse generator 30 which may be of conventional design and is used to set or determine the phase relationship between the red, green and blue gating pulses from generator 31, and the scanning of the three primary color phosphors R, G, B. The mode set pulse generator 30 is required particularly where the phase relationship between the index signal and the color phosphor stripes R, G, B is not constant, for example, in beam index cathode-ray tubes in which the index stripes I are separated by only two color phosphor stripes, as is shown in FIG. 2, rather than by a full set of all three color phosphor stripes. The mode set pulse generator 30 may, for example, count a predetermined number of index pulses arising from scanning of index stripes on a run-in area of the screen to produce a mode set pulse which is applied to gate pulse generator 31. The mode set pulse causes the ring counter within gate pulse generator 31 to be set at the commencement of scanning of the image area so that the gating pulses thereafter generated are in phase with the colors of the phosphors then being scanned.

There are inevitable delays between the time that a particular index stripe I is struck by the electron beam and the resulting gating pulse issue from generator 31 for controlling color switching by gate circuit 32. For example, there are time delays introduced by the operation of bandpass filter 21 and PLL circuit 22. In order to maintain proper color registration of the image produced upon screen 13 it is necessary that such delays be compensated for so that the operation of gate circuit 32 can be accurately synchronized with the actual scanning position of the electron beam, and so that primary color signals $E_R$, $E_G$ and $E_B$ modulate the electron beam as that beam scans the corresponding color phosphor stripes R, G and B, respectively. If such time delays are constant they can easily be compensated for by properly choosing the timing parameters of the components in the feedback loop constituted by photodetector 20, bandpass filter 21, PLL circuit 22, gate pulse generator 31, gate circuit 32, drive circuit 34 and picture tube 10. Unfortunately, the delay associated with that feedback loop, particularly the delay associated with the phase difference between the two inputs of phase comparator 23, varies as a function of the frequency of the index signal. For this reason, deviations in the horizontal scanning rate of the electron beam upon screen 13 make it difficult to maintain proper color registration.

In order to prevent such deviations in the horizontal scanning rate, correction values that represent deviations of the horizontal scanning rate from a desired scanning rate at a plurality of horizontal sampling positions along a plurality of predetermined horizontal scanning lines may be stored in a memory. Such correction values can then be read from the memory to provide corresponding correction signals to beam deflection device 16 by which deviations of the horizontal scanning rate are substantially cancelled.

The above-described apparatus can accurately cancel scanning rate deviations occurring in a horizontal scanning line only so long as the correction values read from the memory during the reproduction of that line accurately correspond to the then occurring uncorrected horizontal scanning rate of the electron beam. For example, enough information will be provided to accurately compensate for deviations in the horizontal scanning rate for a given horizontal line if the control voltage $E_{CV}$, shown graphically at the bottom of FIG. 3, supplied to voltage-controlled oscillator 25 is converted by an analog-to-digital converter and recorded in a memory for each of 32 sampling positions indicated at $P_0$, $P_1$, $P_2$ ... $P_{30}$ and $P_{31}$ on FIG. 3, along that given horizontal line. In order to achieve the most accurate correction of deviations in the horizontal scanning rate, it would be desirable to record correction values for each of such 32 sampling position along each of the over 200 horizontal lines within the effective picture or image area 100 of a video field. Unfortunately, this would require the memory to have a very large storage capacity, which would result in an undesirable increase in cost.

Figure 3:
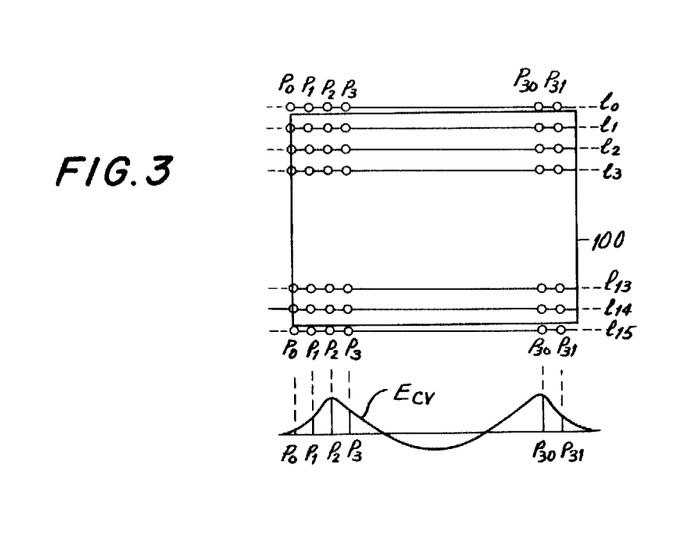
FIGS. 3 and 4 are diagrams to which reference is made in explaining the writing and reading, respectively, of information in a memory included in the apparatus of FIG. 1.

In order to avoid the need for such a very large storage capacity in the memory, it is possible to provide apparatus which stores 32 correction values, one for each of 32 horizontal sampling positions, $P_0$–$P_{31}$, on each of only 16 predetermined horizontal sampling lines, $L_0$, $L_1$, $L_2$ ... $L_{14}$, and $L_{15}$. These 16 sampling lines, $L_0$–$L_{15}$, could be spaced at every 16th horizontal line throughout a given video field so that, as shown in FIG. 3, 14 of the sampling lines would lie within the effective picture portion 100 of a video field, and two lines, $L_0$ and $L_{15}$, would lie in portions of the raster scan occurring, respectively, before and after the effective picture portion 100, that is, above and below the image area. The storage of correction values for only one in each 16 horizontal lines obviously greatly reduces the capacity required of the memory of such correction apparatus.

In the case in which correction values are stored in the memory for only 16 sampling lines, $L_0$–$L_{15}$, it is necessary to provide a way for supplying a deflection correction signal to beam deflection device 16 during the reproduction of the 15 horizontal lines which occur between adjacent sampling lines. The simplest way of doing this is by having the apparatus read from the memory the same 32 correction values during the scanning of each of those 15 horizontal lines that would be read from memory at corresponding time periods during the scanning of the immediately preceding sampling line. Although this technique is very simple, the correction it makes in the horizontal scanning rate may be less than is desirable, as illustrated in FIG. 4.

Figure 4:
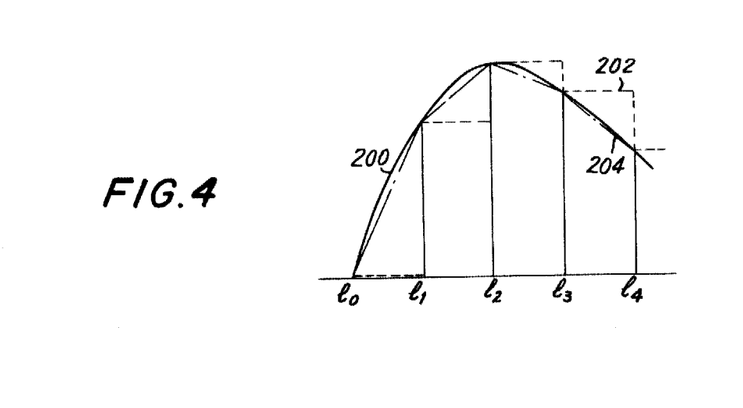

The solid line 200 in FIG. 4 represents the changes in horizontal scanning rate that occur at a given horizontal location as a function of changes in vertical position within a video field. If these changes in horizontal scanning rate are recorded only for the sampling lines occurring at every 16th horizontal line, such as the sampling lines $L_0$–$L_4$ shown in FIG. 4, and if the correction values recorded for each of these sampling lines are used as the correction values for each of the subsequent 15 horizontal lines, then the deflection correction signals supplied to beam deflection device 16 will have a discontinuous function as shown by broken line 202 in FIG. 4. The resulting discontinuities in the deflection correction signals may give rise to the appearance of horizontal bands in the image produced by picture tube 10.

In accordance with the present invention, apparatus is provided which stores correction values only for a small fraction of the total number of horizontal lines in a video field, and which causes the horizontal scanning rate correction for those horizontal lines for which no correction values have been stored to vary continuously as a function of vertical position, so as to produce an image upon screen 13 which is substantially free of distortion. In the embodiment of the invention illustrated by FIG. 1, such apparatus is shown to include a memory 40 for storing correction values that represent deviations of the horizontal scanning rate of the electron beam from a desired scanning rate at each of a plurality of predetermined horizontal sampling positions along each of a plurality of predetermined sampling lines $L_0$–$L_{15}$ from among the horizontal lines scanned by the electron beam. The correction apparatus also comprises a reading circuit including a digital-to-analog converter 50, a line address signal generating circuit 51, a point address signal generating circuit 52 and an AND gate 53. Such reading circuit is capable of reading from memory 40 stored correction values corresponding to respective horizontal scanning positions of the electron beam along a horizontal line being scanned by the electron beam, so that each of the correction values being read represents a deviation of the horizontal scanning rate at a horizontal sampling position on one of the sampling lines for which correction values have been recorded, with such horizontal sampling position corresponding to the actual horizontal scanning position of the electron beam at the time of reading. The reading circuit is also capable of producing a sampling line correction signal in correspondence to each of the correction values read from memory 40. The apparatus provided in accordance with this invention is also shown to include a scanned line correction signal generating circuit which, in FIG. 1, includes a coefficient signal generating circuit 60, a multiplying circuit 61, and an adding circuit 62. The circuit 62 is shown to include a capacitor 63, means constituted by transistors 64 and 65 for placing a first analog voltage on capacitor 63, and means including transistors 66 and 67 and inverters 68 and 69 for placing a second analog voltage in series with capacitor 63 once the latter has been charged. The scanned line correction signal generating circuit is capable of producing, for a given horizontal scanning position of the electron beam, a scanned line correction signal of a value which is a function of the sampling line correction signal produced by the reading means in response to that given horizontal scanning position and also a function of the vertical position of the horizontal line being scanned. The scanned line correction signal produced, as aforesaid, is shown to be applied to beam deflection device 16, so that a deviation of the horizontal scanning rate along the scanned line is substantially cancelled, by means of a filter having a capacitor 70 and a resistor 71, a differential amplifier 72 connected to an adjustably fixed voltage source 73 and a wire 74.

The apparatus of FIG. 1 is further shown to be provided with a writing circuit including a low-pass filter 80 and an analog-to-digital converter 81, for obtaining the correction values from the index signal processing circuit comprised of photodetector 20, bandpass filter 21 and phase-locked loop circuit 22, and for writing those correction values in memory 40.

As will be described below, the horizontal scanning rate correction apparatus disclosed in FIG. 1 is capable of producing scanned line correction signals during scanning of a horizontal line other than one of the sampling lines for which correction values have been recorded by linearly interpolating sampling line correction values produced by the reading circuit on the basis of the vertical position of the scanned line relative to the vertical positions of the sampling lines to which sampling line correction signals correspond. As can be seen from the chain line 204 on FIG. 4, such linearly interpolated scanned line correction signals produce a very close approximation to the changes in the horizontal scanning rate that actually occur at a given horizontal location as a function of changes in the vertical position, as represented by solid line 200 on FIG. 4.

In the embodiment of the invention shown in FIG. 1, low-pass filter 80 has its input connected to the output of low-pass filter 24 so as to receive the control voltages supplied from low-pass filter 24 to voltage-controlled oscillator 25. The output of low-pass filter 80 is connected to the input of analog-to-digital converter 81, and the multi-bit digital output of analog-to-digital converter 81 is supplied through a W contact of a mode switch 33b to a data input of memory 40, which may be a random-access memory capable of writing, storing and reading a plurality of multi-bit digital values each at a respective memory address.

The line address signal generating circuit 51 receives vertical and horizontal blanking signals $V_B$ and $H_B$, respectively, is also connected through R contacts of mode switches 33c and 33d to receive clock signals $C_1$ and $C_2$, respectively. Line address signal generating circuit 51 provides to memory 40 a line address signal of 4-bits which constitute the high order 4-bits of a 9-bit address word used to address correction values in memory 40. These 4-bits indicate the sampling line to which the correction value written or read in response to a given address word will correspond. In response to the presence or absence of input from mode switches 33c and 33d, line address signal generating circuit 51 also provides a WRITE/READ signal to memory 40 to determine whether the memory will write a value then being supplied to it at a given memory address or read a correction value from such memory address and supply it at its data output. Line address signal generating circuit 51 also provides a sampling line gate signal to a W contact of a mode switch 33e and to an input of coefficient signal generating circuit 60. Finally, circuit 51 provides a 4-bit relative vertical position indicating signal to coefficient signal generating circuit 60.

Point address signal generating circuit 52 also receives the vertical and horizontal blanking pulses $V_B$ and $H_B$, respectively, and the output of AND gate 53 which has clock signal $C_1$ and the output from mode switch 33e applied to its inputs. An R contact of switch 33e is connected to a position potential and the W contact of switch 33e receives the sampling line gate signal from circuit 51 as noted above. The output of point address signal generating circuit 52 is a 5-bit point address signal which is supplied to memory 40 to form the lower 5-bits of the address word for that memory. These 5-bits are used to indicate to which of the 32 horizontal sampling positions on a given sampling line the correction values written or read from memory 40 will correspond. Point address signal generating circuit 52 also suitably provides a memory enable signal to memory 40 in response to pulses from AND gate 53 which causes that memory to either write or read a correction value, depending upon the value of the READ/WRITE signal supplied to memory 40 by line address signal generating circuit 51.

The coefficient signal generating circuit 60 receives, as its inputs, the sampling line gate signal and the 4-bit relative vertical position indicating signal, both from line address signal generating circuit 51, as described above. Coefficient signal generating circuit 60 also receives, as an input, a complementing clock signal $C_X$. Coefficient signal generating circuit 60 provides a 4-bit coefficient signal as an output. This 4-bit coefficient signal is supplied to a multiplier input of multiplying circuit 61.

The multi-bit correction values which are stored in memory 40 are adapted to be applied, through the R contact of mode switch 33b, to a digital input of digital-to-analog converter 50. The analog output of converter 50 is supplied to the multiplicand input of multiplying circuit 61. The output of multiplying circuit 61 is connected to the input of adding circuit 62. As earlier noted, circuit 62 is comprised of capacitor 63 and the four transistors 64–67, which are desirably field-effect transistors, as shown. Capacitor 63 is connected in series between transistors 64 and 65, so that, when those transistors are turned ON, capacitor 63 is connected between the output of multiplying circuit 61 and ground. The gates of transistors 64 and 65 are connected to the output of inverter 68 which receives clock signal $C_2$ as its input. Capacitor 63 is similarly connected in series between transistors 66 and 67 so that, when those two transistors are turned ON, capacitor 63 is connected between the output of multiplying circuit 61 and one of the two inputs of differential amplifier 72. The gates of transistors 66 and 67 are connected to the output of inverter 69 which receives clock signal $C_1$ as its input.

The input of differential amplifier 72 that receives the output from adding circuit 62 is also connected to one end of parallel connected capacitor 70 and resistor 71 which, at their other end, are connected to ground. The other input of differential amplifier 72 is connected to adjustably fixed voltage source 73.

Figure 5:
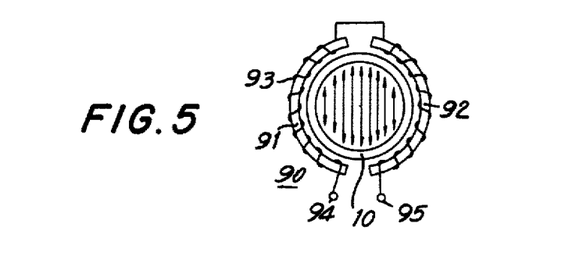
FIG. 5 shows a correction coil included in the deflection device the cathode-ray tube in FIG. 1.

The output of differential amplifier 72 is supplied through wire 74 to a deflection correction device 90 which constitutes part of beam deflection device 16, and which may be desirably formed, as shown in FIG. 5, by a pair of ferrite cores 91 and 92 of semi-annular shape which are placed in horizontally opposing positions around the neck portion of picture tube 10 near to the conventional fourth grid of the electron gun. A correction coil 93, having two ends 94 and 95 between which the deflection correction signal is supplied, is wrapped around cores 91 and 92 so that a magnetic field will be induced in the vertical direction, as indicated by the arrows on FIG. 5, to horizontally deflect the electron beam.

In operation, the apparatus of FIG. 1 functions in one or the other of two modes: that is, a WRITE mode, in which correction values are derived from the control voltage supplied to voltage-controlled oscillator 25 and are recorded in memory 40; and a READ mode, in which correction values are read from memory 40, and in which a scanned line correction signals are produced in accordance with the read correction values and are supplied to deflection correction device 90, so that deviations in the horizontal scanning rate are substantially cancelled. The mode switches 33a to 33e are preferably ganged so as to movable together for change-over of the apparatus of FIG. 1 between the WRITE and the READ modes upon engagement of their movable contacts with the respective W and R contacts. The mode switches 33a–33e may be operated automatically by a suitable mode control means (not shown) so that, whenever the television receiver including the circuitry of FIG. 1 is initially turned on, all of the mode switches 33a–33e will connect their respective W contacts and the apparatus will be set to operate in the WRITE mode until all of the correction values have been written, and then the mode control means will cause the apparatus to be changed-over to the READ mode in which the apparatus functions to reproduce video signals on screen 13.

When mode switches 33a–33e are positioned to establish the WRITE mode, the input of drive circuit 34 is connected, through fixed contact W of mode switch 33a, to an adjustably fixed voltage source 96 so that grid 12 receives a suitable voltage to provide the electron beam projected upon screen 13 with a constant beam current. In the WRITE mode, this constant intensity electron beam is made to scan across the screen 13 under the influence of the horizontal and vertical beam deflection signals supplied to horizontal and vertical deflection coils 94, which constitute parts of beam deflection device 16 separate from deflection correction device 90. As a result, an index signal is detected by photodetector 20, filtered by bandpass filter 21 and supplied to PLL circuit 22. This index signal has a frequency that varies in response to any changes in the scanning speed of the electron beam across screen 13 under the influence of horizontal and vertical deflection coils 97.

Figure 6:
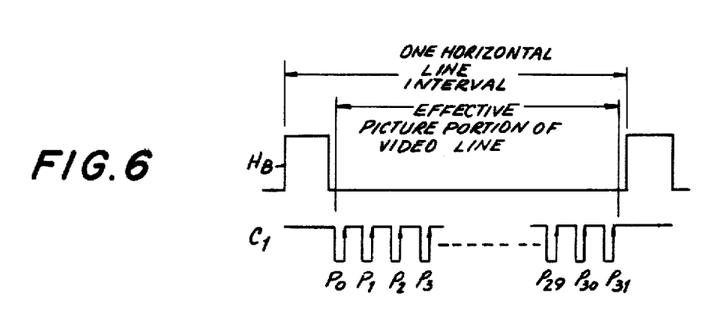
FIGS. 6 and 7 are waveform diagrams to which reference is made in explaining the timing of the operation of the embodiment of the invention shown in FIG. 1.

In response to this index signal, PLL circuit 22 produces a control voltage at the output of low-pass filter 24 which varies in proportion to changes in the frequency of the index signal and, thus, in proportion to changes in the horizontal scanning rate. Such control voltage is supplied through low-pass filter 80 to the input of analog-to-digital converter 81, where it is converted to a multi-bit digital value which is supplied through contact W of mode switch 33b to the input of memory 40. The clock signal $C_1$ is supplied to the clocking input of analog-to-digital converter 81 so that it converts the control voltage to a digital value at each pulse of the clock signal $C_1$ as shown in FIG. 6. As is indicated in FIG. 6, each of the clock pulses of the signal $C_1$ corresponds to one of the horizontal sampling positions $P_0$–$P_{31}$ for which correction values are to be stored in memory 40.

Figure 7:
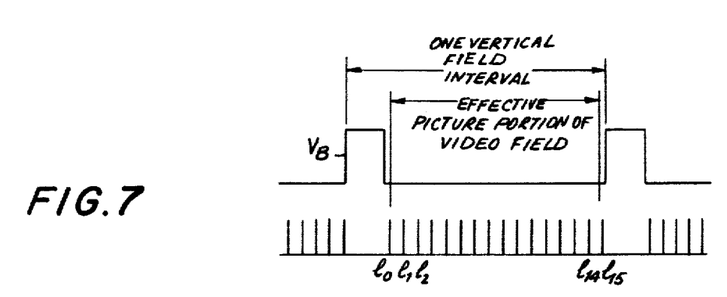

In the WRITE mode, mode switches 33c and 33d prevent clock signals $C_1$ and $C_2$ from being supplied to line address signal generating circuit 51 and, as a result, the WRITE/READ signal supplied by circuit 51 to memory 40 is set so as to cause memory 40 to operate in the WRITE mode. Further, in the WRITE mode, line address signal generating circuit 51 counts horizontal blanking pulses $H_B$ and is reset by vertical blanking pulses $V_B$, so as to keep within circuit 51 a count of the number of the horizontal line within a video field currently being scanned by the electron beam of picture tube 10. The 4 high-order bits of this count are supplied to memory 40 as the line address signal and the 4 low-order bits of this count are supplied to coefficient signal generating circuit 60 as the relative vertical position indicating signal. When the 4 low-order bits of this count are all equal to zero, the electron beam of picture tube 10 is sweeping one of the sampling lines $L_0$–$L_{15}$ and the sampling line gate signal supplied from circuit 51 to contact W of switch 33e goes high. The relative timing of these 16 sampling lines relative to the vertical field interval is illustrated in FIG. 7.

In the WRITE mode, when each of these sampling lines $L_0$–$L_{15}$ is scanned by the electron beam, the high value of the sampling line gate signal causes clock signal $C_1$ to be gated through AND gate 53 to point address signal generating circuit 52 which counts the pulses of clock signal $C_1$ occurring at each of the 32 horizontal sampling positions $P_0-P_{31}$ on each sampling line. The 5-bit count in point address signal generating circuit 52 is reset by the vertical and horizontal blanking signals $V_B$ and $V_H$, respectively. Thus, it can be seen that memory 40 is supplied with a 9-bit address word, the lower 5 bits of which are incremented by one each time a horizontal sampling position $P_0-P_{31}$ is scanned, and the upper 4 bits of which are incremented by one each time a new one of the sampling lines $L_0-L_{15}$ is ready to be scanned.

In addition, point address signal generating circuit 52 provides a memory enable signal to memory 40 in response to each pulse in clock signal $C_1$ so that, in the WRITE mode, at each of the 32 horizontal sampling positions $P_0-P_{31}$ of each sampling line $L_0-L_{15}$, a correction value corresponding to the control voltage supplied to voltage-controlled oscillator 25 during the scanning of the respective horizontal sampling position will be recorded in memory 40 at an address uniquely identifying the horizontal sampling position and sampling line for which it was recorded.

The function of low-pass filter 80 is to remove from the control voltage supplied to analog-to-digital converter 81 those variations that have a high frequency relative to the frequency at which converter 81 samples the control voltage and converts it into digital values, so that each resulting correction value stored in memory 40 represents the average value of the control voltage at the time that each such sampling is made.

In the embodiment of the invention shown in FIG. 1, memory 40 is a random-access memory (RAM). Random-access memory normally loses the values stored in it when its power is shut off. For this reason, the apparatus of FIG. 1 should be set to its WRITE mode briefly each time it is turned ON, so that suitable correction values will be stored in memory 40 before the subsequent operation of the apparatus in the READ mode.

After a complete set of correction values has been stored in memory 40, the apparatus of FIG. 1 can be changed-over to the READ mode in which all of the mode switches 33a–33e engage their respective R contacts. In the READ mode, switch 33a connects the input of drive circuit 34 through its contact R to the output of gate circuit 32. Thus, in the READ mode, color signals $E_R$, $E_G$ and $E_B$ are sequentially supplied through drive circuit 34 to grid 12 in the manner described above, so that color video images are reproduced upon screen 13. Further, in the READ mode, scanned line correction signals are generated and supplied to correction device 90 so as to substantially cancel deviations in the horizontal scanning speed.

Figure 8:
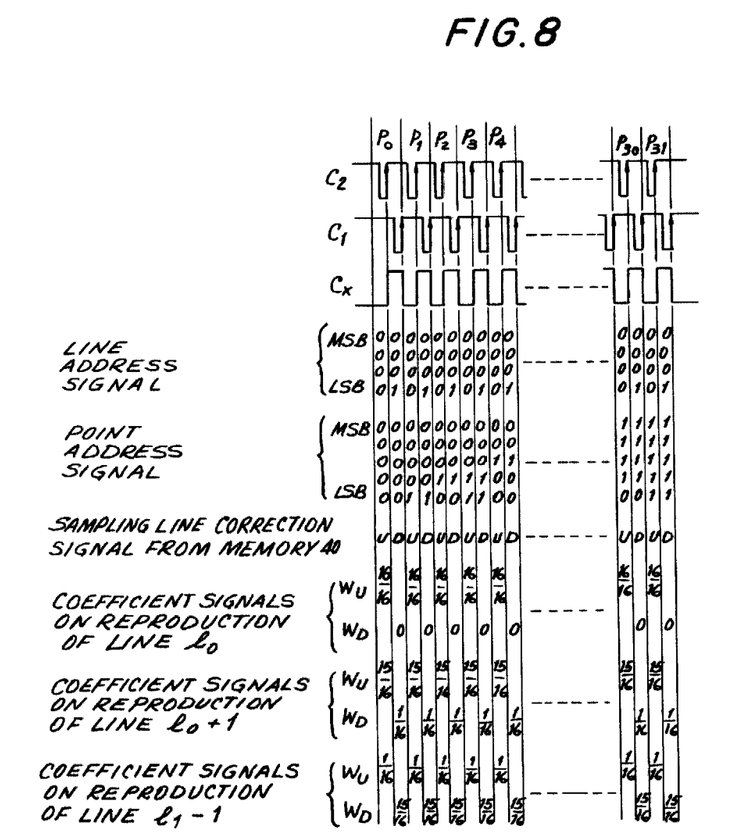
FIG. 8 shows waveform diagrams representing various signals produced in the embodiment of the invention shown in FIG. 1, and to which reference will be made in explaining the operation thereof.

In the READ mode, vertical and horizontal blanking pulses $V_B$ and $V_H$ are applied to line address signal generating circuit 51, and switches 33c and 33d are positioned to supply clock signal $C_1$ and clock signal $C_2$, which is shifted in phase relative to clock $C_1$ as shown in FIG. 8, to line address signal generating circuit 51.

In response to the receipt of those clock signals $C_1$ and $C_2$ line address signal generating circuit 51 suitably causes the WRITE/READ signal supplied to memory 40 to condition such memory in its READ mode. At the rising edge of each clock signal $C_1$ the 4-bit line address signal supplied by the line address generator 51 to memory 40 is set to the same value as the 4 most significant bits contained within the counter of line address signal generating circuit 51. At the rising edge of clock signal $C_2$ the 4-bit line address signal will be set to a value one greater than the 4 most significant bits of the horizontal line count then contained within line address signal generating circuit 51. For example, when the line currently being scanned on screen 13 ranges from the first sampling line $L_0$ to the horizontal line occurring immediately before the next sampling line $L_1$, the line address signal will be set to "0000" at the rising edge of clock signal $C_1$ and will be set to "0001" at the rising edge of clock signal $C_2$ as shown in FIG. 8.

In the READ mode, mode switch 33e causes a high signal to be supplied to AND gate 53 during the scanning of all horizontal lines. As a result, point address signal generating circuit 51 counts a clock pulse and produces a memory enable signal at each of the 32 horizontal sampling positions $P_0-P_{31}$ during each of the horizontal lines of the video field. As a result of counting clock pulses $C_1$, point address signal generating circuit 51 provides a 5-bit point address signal to memory 40 which corresponds to the number of the horizontal sampling positions $P_0-P_{31}$ currently being scanned.

Thus, as is indicated in FIG. 8, two address values are supplied to memory 40 at each horizontal sampling position $P_0-P_{31}$ scanned by the electron beam on screen 13, a first address value being the address of the corresponding horizontal sampling position on the highest number sampling line which the electron beam has started to scan within the current video field, and the second supplied address value being the address of the corresponding horizontal sampling position on the next sampling line to be scanned by the electron beam. As a result, for each horizontal sampling position scanned by the electron beam, two correction values are read from memory 40, namely, a first correction value U corresponding to an upper sampling line, which is the sampling line at or immediately above the horizontal line currently being scanned, and a second correction value D corresponding to a lower sampling line, which is the sampling line immediately below the horizontal line currently being scanned. In the READ mode, these multi-bit digital correction values U and D are applied through contact R of mode switch 33b to the digital input of digital-to-analog converter 50 where they are continuously converted into a corresponding analog voltage supplied to the multiplicand input of multiplying circuit 61.

As mentioned above, the line address signal generating circuit 51 supplies a sampling line gate signal and a 4-bit relative vertical position signal to coefficient signal generating circuit 60. Coefficient signal generating circuit 60 also receives a complementing clock signal $C_X$, which rises at the rising edge of clock signal $C_2$ and falls off at the rising edge of the clock signal $C_1$, as shown in FIG. 8. Coefficient signal generating circuit 60 produces a 4-bit weighting coefficient $W_U$ when the complementing pulse $C_X$ is "0" or low during the time that the upper sampling line correction value U is read from memory 40, and circuit 60 produces a weighting coefficient $W_D$ when the complementing signal $C_X$ is "1" or high during the time that the lower sampling correction value D is read from memory 40. These 4-bit weighting coefficients are each capable of representing the values 0, 1/16, 2/16, . . . , 15/16 and 16/16. For each horizontal line, scanned the weighting coefficient $W_D$ equals 1/16 times the value of the lower 4-bits of the horizontal line count contained within line address signal generating circuit 51, and the weighting coefficient $W_U$ equals $1 - W_D$. Thus, for example, as is shown in FIG. 8, upon the reproduction of sampling line $L_0$, $W_U$ is 16/16 and $W_D$ is 0. Similarly, during the reproduction of the next horizontal line, that is, the line $L_0 + 1$, $W_U$ is 15/16 and $W_D$ is 1/16. And finally upon reproduction of the last horizontal line before the next sampling line $L_1$, that is, upon the reproduction of the horizontal line $L_1 - 1$, $W_U$ is 1/16 and $W_D$ is 15/16. As can be seen from this example, the coefficients $W_U$ and $W_D$ change linearly in accordance with the vertical position of the horizontal line to be reproduced.

Clock signals $C_X$ cause coefficient $W_U$ to be applied to multiplying circuit 61 at the same time that the upper sampling line correction value U is being read from memory 40 and converted into an analog voltage by digital-to-analog converter 50. In a similar manner, the clock signals $C_X$ cause the coefficient $W_D$ to be supplied to multiplying circuit 61 at the same time that the lower sampling line correction value D is being read from memory 40 and converted into an analog voltage by digital-to-analog converter 50. As a result, multiplying circuit 61 first has an output voltage corresponding to $W_U \cdot U$ and then has an output voltage corresponding to $W_D \cdot D$ for each of the horizontal sampling positions $P_0-P_{31}$ scanned by the electron beam on screen 13. These alternate weighted line sampling signals $W_U \cdot U$ and $W_D \cdot D$ are supplied to the input of adding circuit 62.

During the time that signal $W_U \cdot U$ is applied to adding circuit 62, clock signal $C_2$ has a brief low voltage. This brief low voltage is inverted by inverter 68 to produce a brief positive pulse which is supplied to the gates of transistors 64 and 65 so as to turn those transistors ON and to apply the voltage of signal $W_U \cdot U$ across capacitor 63. This charge remains on capacitor 63 upon termination of the brief positive pulse from inverter 68.

The output of multiplying circuit 61 is such that it can either add charge to or remove charge from capacitor 63 so as to maintain its own output voltage at the voltage $W_U \cdot U$. As a result, the voltage left on capacitor 63 at the end of the time that transistors 64 and 65 are turned ON is independent of the charge that was on capacitor 63 prior to that time. During the time that the signal $W_D \cdot D$ is supplied to the input of adding circuit 62, clock signal $C_1$ has a brief low pulse. This low pulse is inverted by inverter 60 so as to produce a brief positive pulse which is supplied to the gates of transistors 66 and 67 so as to turn ON those transistors and thereby apply the voltage upon capacitor 63 in series with the output of multiplying circuit 61 to one of the inputs of differential amplifier 72. Thus, it can be seen that the signal supplied to that one input of differential amplifier 72 is equal to the sum of $W_U \cdot U$ and $W_D \cdot D$.

It will be noted that, in FIG. 8, the first negative pulse in clock signal $C_1$ is not shown to occur until near the end of the period $P_0$. Such first negative pulse in the clock signal $C_1$ corresponds with the time for which a correction value was recorded or stored in the memory for the horizontal sampling position $P_0$. This is desirable because it is not until the end of the period $P_0$ shown in FIG. 8 that the scanned line correction signal $W_U \cdot U + W_D \cdot D$ is applied through differential amplifier 72 to the correction coil 93 of device 90. Thus, it can be seen that a scanned line correction signal calculated from correction values recorded at the time that the horizontal sampling position $P_0$ was scanned is supplied to the correction coil 93 at the time that a corresponding horizontal sampling position $P_0$ is being scanned during the reproduction of a video signal. It will be noted that the upper line correction value U is read from memory 40 during the first half of the time period $P_0$ indicated on FIG. 8 because clock signal $C_1$ was the last signal to have a rising edge during the previous horizontal interval.

The function of the filter comprised of capacitor 70 and resistor 71 is to hold the scanned line correction signal supplied by adding circuit 62 for one horizontal sampling position until the next scanned line correction signal is supplied from adding circuit 62 in correspondence with the next horizontal sampling position.

The apparatus shown in FIG. 1 is designed so that the scanned line correction signals supplied to coil 93 generate a magnetic field which, at any time, is sufficient to substantially cancel unwanted deviations in the horizontal scanning rate. As discussed above, the correction values stored in memory 40 vary in proportion to the frequency of the index signal at various horizontal sampling positions $P_0-P_{31}$ along each of the horizontal sampling lines $L_0-L_{15}$ when the apparatus was last operated in the WRITE mode. When the apparatus is operated in the READ mode, the correction values corresponding to the horizontal sampling position currently being scanned on the two nearest sampling lines are read from memory 40 and converted into proportionally corresponding analog voltages by digital-to-analog converter 50. Then by means of multiplying circuit 61 and adding circuit 62 a scanned line correction signal is produced by linearly interpolating between the analog voltages corresponding to the two correction values read from memory 40 on the basis of the relative distance of the horizontal line being scanned from each of the sampling lines for which each of those correction values was recorded. As a result, the scanned line correction signal supplied to the input of differential amplifier 72 corresponds fairly accurately to the horizontal scanning rate on each of the horizontal lines scanned on screen 13, as is indicated by the close aproximation of chain line 204 of FIG. 4 to the solid line 200.

The voltage applied to the second input of differential amplifier 72 from adjustably fixed voltage source 73 is selected to equal the output of adding circuit 62 that would result upon the reproduction of a sampling line $L_0-L_{15}$ when the upper sampling line correction value U read from memory 40 represented the desired horizontal scanning rate. In other words, the voltage supplied to the second input of amplifier 72 is one which corresponds with the desired scanning rate. Thus, the voltage of the scanned line correction signal produced at the output of differential amplifier 72 varies in proportion to a determined horizontal scanning rate error, that is, in proportion to the difference between a desired horizontal scanning rate and substantially the horizontal scanning rate which the electron beam would have without any correction.

The voltage of the scanned line correction signal is integrated by the inductance of coil 93 to produce a current in that coil and a resulting magnetic field which are both proportional to the integral of the calculated horizontal scanning rate error. The horizontal scanning rate of the electron beam is altered by an amount substantially proportional to the rate of change of the magnetic field created by the flow of the current in coil 93. As a result, the horizontal scanning rate is altered by an amount substantially proportional to the differential of the integral of the horizontal scanning rate error, that is, by an amount substantially proportional to the horizontal scanning rate error itself. Thus, by applying the deflection correction signal to coil 93 with the proper polarity, it is possible to substantially cancel the horizontal scanning rate error of picture tube 10.

By way of summary, it will be appreciated, that in the above-described apparatus in accordance with this invention, the horizontal scanning rate is corrected for each horizontal line of the video field by reference to correction values representing deviations of the horizontal scanning rate of the electron beam and which are recorded or stored for only a small percentage of the total number of horizontal lines. As a result, the memory capacity required in this apparatus is greatly reduced, even though it is possible for the correction of the horizontal scanning rate for those lines for which no correction values were recorded to correspond quite closely to the correction that would be made had correction values been recorded for each individual horizontal line.

The apparatus disclosed in FIG. 1 not only compensates for deviations in the horizontal scanning rate which can be predicted from the design of the cathode-ray tube, but it also compensates for deviations in the horizontal scanning rate which may result from the unpredictable irregularity of circuit components within a given individual cathode-ray tube or associated therewith. As a result, the horizontal scanning rate of such cathode-ray tubes can be kept substantially constant, preventing distortion of the shapes of the images reproduced and preventing color misregistration.

The substantially constant frequency of the index signal made possible by this invention enables PLL circuit 22 to maintain synchronism with the index signal, even when that signal is weak, for example, due to a low beam current associated with the reproduction of a dark image area upon the screen of the picture tube. As a result, this invention makes it possible to lower the minimum electron beam current while still maintaining synchronization of the PLL circuit, allowing low luminance portions of a video signal to be darker when reproduced and, thus, improving the contrast of the resulting displayed image.

As discussed above, the apparatus shown in FIG. 1 has a WRITE mode in which new correction values can easily be recorded in memory 40, for example, when the apparatus is first turned ON. It will be apparent that an embodiment of the present invention could be provided which is identical to that of FIG. 1 except for the fact that it does not provide for operation in a WRITE mode. In such an alternative embodiment of the invention, memory 40 would be comprised of a read-only memory (ROM) and correction values would be written in memory 40 by means of circuitry external to the apparatus, for example, circuitry at the factory where the apparatus is manufactured, or at a repair shop where such apparatus might be serviced. Although this alternative embodiment would have the disadvantage of not being able to have its correction values renewed as frequently, or as easily, as the apparatus shown in FIG. 1, it would have the offsetting advantage of avoiding the need for the devices in the apparatus of FIG. 1, such as, mode switches 33a–33e, low-pass filter 80, and analog-to-digital converter 81, required for change-over to the WRITE mode.

It will also be apparent that, in a horizontal scanning rate correction apparatus according to the present invention, after an upper sampling line correction value U and a lower sampling line correction value D have been read from memory 40 in digital form, the could each be multiplied by their respective weighting coefficient, $W_U$ and $W_D$, and the resulting products could each be added digitally so as to produce a digital value $W_U \cdot U + W_D \cdot D$ which could then be converted to an analog voltage and supplied to one of the inputs of differential amplifier 72.

In addition, it will be apparent that it would be possible to provide an embodiment of the present invention which used two memory devices each containing all of the correction values recorded for each of the sampling lines. This would make it possible for the apparatus to simultaneously read the upper sampling line correction value U from one memory and the lower sampling line correction value D from the other memory.

It will also be apparent that, with appropriate changes in the means which delivers the scanned line correction signal to the beam deflection device, the beam deflection device which is used to correct for errors in the horizontal scanning rate could be of an electrostatic type. Furthermore, it will be apparent that the desired deflection correction could be effected through the main horizontal deflection coil 97 of the cathode-ray tube. For example, a saturable reactor could be employed which has the deflection correction signal supplied to its primary winding and which has its secondary winding connected in series with the horizontal deflection winding of the cathode-ray tube so that the deflection correction signal can be used to vary the magnitude of the horizontal beam deflection signal which would normally be applied to the horizontal deflection winding.

Furthermore, it will be apparent that the horizontal scanning rate correction apparatus according to this invention can be used with cathode-ray tubes in video apparatus other than television receivers, such as, for example, in computer terminals.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. Horizontal scanning rate correction apparatus for a cathode-ray tube having a screen, means for projecting an electron beam upon said screen, and a beam deflection device supplied with at least horizontal and vertical beam deflection signals for causing said beam to repeatedly scan across said screen in a vertical succession of horizontal lines, said apparatus comprising:

memory means for storing a plurality of correction values representing deviations of the horizontal scanning rate of said beam from a desired scanning rate at a plurality of predetermined horizontal sampling positions along each of a plurality of predetermined sampling lines from among said horizontal lines;

reading means for reading a selected one of said stored correction values for each horizontal scanning position of said electron beam along a scanned one of said horizontal lines, each correction value that is read representing said deviation at a corresponding one of said horizontal sampling positions on one of said sampling lines, said reading means including means for producing a sampling line correction signal corresponding to each of said read correction values;

means for producing, for each said horizontal scanning position, a scanned line correcion signal which is an interpolated function of the sampling line correction signal of the last-scanned sampling line, the corresponding sampling line correction of the next-to-be-scanned sampling line, and the vertical position of the respective scanned line relative to said last-scanned and said next-to-be-scanned sampling lines; and means for supplying said scanned line correction signal to said beam deflection device so that said deviation of the horizontal scanning rate along said scanned line is substantially cancelled.

2. Horizontal scanning rate correction apparatus for a cathode-ray tube having a screen, means for projecting an electron beam upon said screen, and a beam deflection device supplied with at least horizontal and vertical beam deflection signals for causing said beam to repeatedly scan across said screen in a vertical succession of horizontal lines, said apparatus comprising:

memory means for storing a plurality of correction values representing deviations of the horizontal scanning rate of said beam from a desired scanning rate at a plurality of predetermined horizontal sampling positions along each of a plurality of predetermined sampling lines from among said horizontal lines, in which the number of said sampling lines is substantially less than the number of said horizontal lines;

reading means for reading a selected one of said stored correction values for each horizontal scanning position of said electron beam along a scanned one of said horizontal lines, each correction value that is read representing said deviation at a corresponding one of said horizontal sampling positions on one of said sampling lines, said reading means including means for producing a sampling line correction signal corresponding to each of said read correction values;

means for producing, for each said horizontal scanning position, a scanned line correction signal which is a function of said sampling line correction signal and the vertical position of the respective scanned line, said means for producing the scanned line correction signal being operative to adjust said sampling line correction signal in correspondence to the departure of said scanned line from said sampling line to which said read correction values correspond; and means for supplying said scanned line correction signal to said beam deflection device so that said deviation of the horizontal scanning rate along said scanned line is substantially cancelled.

3. Horizontal scanning rate correction apparatus according to claim 2; in which said means for producing the scanned line correction signal includes interpolating means for producing said scanned line correction signal by interpolating between sampling line correction signals on the basis of the vertical position of said scanned line relative to the vertical positions of the sampling lines to which said read correction values correspond.

4. Horizontal scanning rate correction apparatus according to claim 3; in which said sampling lines are separated from each other by unsampled horizontal lines; and in which, when said scanned line is located between two successive ones of said separated sampling lines, two of said correction values are read which respectively correspond to said two successive sampling lines.

5. Horizontal scanning rate correction apparatus according to claim 4; in which said sampling lines are separated from each other by 15 of said unsampled lines.

6. Horizontal scanning rate correction apparatus according to claim 4; in which said beam deflection device includes horizontal and vertical deflection coils for receiving said horizontal and said vertical beam deflection signals, respectively, and a separate correction coil placed on a yoke separate from said horizontal and vertical deflection coils for receiving said scanned line correction signal.

7. Horizontal scanning rate correction apparatus according to claim 4; in which said means for producing the scanned line correction signal includes multiplying means producing two weighted sampling line correction signals by multiplying the sampling line correction signals corresponding to said two read correction values by an interpolation coefficient which varies in inverse proportion to the vertical distance of said scanned line from the sampling line to which the respective read correction value corresponds, and means for adding together said two weighted sampling line correction signals to produce said scanned line correction signal.

8. Horizontal scanning rate correction apparatus according to claim 7; in which said weighted sampling line correction signals are supplied to said means for adding in the form of respective analog voltages; and in which said means for adding includes a capacitor, means for placing a first of said analog voltages on said capacitor, and means for then placing a second of said analog voltages in series with said charged capacitor to produce a voltage which corresponds to the sum of said analog voltages for use as said scanned line correction signal.

9. Horizontal scanning rate correction apparatus according to claim 4; in which said reading means includes line address signal generating means for determining the vertical position, within each video field of said scanned line and for generating, as a function of said vertical position, line address signals effective in said memory means for controlling which two successive ones of said sampling lines are to have their corresponding correction values read, and point address signal generating means for generating a point address signal corresponding to said horizontal scanning position and which is effective in said memory means for controlling which of said horizontal sampling positions along each of said two successive sampling lines addressed by said line address signal generating means is to have its corresponding correction value read.

10. Horizontal scanning rate correction apparatus according to claim 9; in which, for each point address signal supplied by said point address signal generating means, said reading means sequentially reads the correction value corresponding to a first and then to a second of said two successive sampling lines addressed by said line address signal generating means.

11. Horizontal scanning rate correction apparatus according to claim 9; in which said memory means has two simultaneously addressable portions, each containing said correction values for a respective one of said sampling lines; and in which, for each point address signal supplied by said point address signal generating means, said reading means simultaneously reads from said two portions the correction values corresponding to said horizontal scanning position in said two successive sampling lines addressed by said line address signal generating means.

12. Horizontal scanning rate correction apparatus according to claim 4; in which said cathode-ray tube is an index type color cathode-ray tube having a plurality of index elements positioned to be struck by said electron beam as it scans across said screen, color switching circuitry for determining which of a plurality of color signals modulates the intensity of said beam, and an index signal processing circuit for producing an index signal of a frequency determined by the frequency of the incidence of said beam upon said index elements as it scans across said horizontal lines, and for controlling said color switching circuitry; and in which means are provided for producing said correction values from said index signal processing circuit when said sampling lines are scanned by the beam in accordance with said horizontal and vertical beam deflection signals.

13. Horizontal scanning rate correction apparatus according to claim 12; in which said index elements are spaced across said horizontal lines so that the frequency of said index signal varies in proportion to variations in said horizontal scanning rate, and in which said correction values, as stored in said memory means, record changes in the frequency of said index signal.

14. Horizontal scanning rate correction apparatus according to claim 13; in which said index signal processing circuit includes a phase-locked loop which has a phase comparator receiving said index signal as a first input signal, a voltage-controlled oscillator, means connected to the output of said phase comparator for supplying a control voltage to said voltage-controlled oscillator, and means for supplying a second input signal to said phase comparator the frequency of which is controlled by the output of said voltage-controlled oscillator so that said output of the phase comparator varies with changes in said index signal to provide a corresponding change in the output of said voltage-controlled oscillator; and in which said correction values are derived from said control voltage supplied to said voltage-controlled oscillator.

15. Horizontal scanning rate correction apparatus according to claim 12; in which said memory means includes a read-only memory for storing said correction values in digital form; and in which said correction values produced from said index signal processing circuit have been written in said read-only memory by circuitry external to said horizontal scanning rate correction apparatus.

16. Horizontal scanning rate correction apparatus according to claim 12; further including writing means for writing said correction values in said memory means, and mode switching means for switching said apparatus between a READ mode in which said reading means, said means for producing the scanned line correction signal, and said means for supplying said scanned line correction signal to said beam deflection device are operative, and a WRITE mode in which said writing means is operative.

17. Horizontal scanning rate correction apparatus according to claim 16; in which said cathode-ray tube has an electrode to which a signal is supplied for controlling the intensity of said electron beam; and in which said apparatus further comprises means for supplying a signal to said electrode when said mode switching means switches said apparatus to said WRITE mode so that said beam has a substantially constant current as it scans across said index elements during said WRITE mode.

18. Horizontal scanning rate correction apparatus according to claim 4; in which said memory means includes a read-only memory for storing said correction values in digital form.

* * * * *